United States Patent

Markley

[15] 3,659,686

[45] May 2, 1972

[54] BRAKE MEANS FOR ELECTRIC MOTORS

[72] Inventor: Joseph M. Markley, Southington, Conn.

[73] Assignee: Robbins & Myers, Inc., Springfield, Ohio

[22] Filed: Jan. 19, 1970

[21] Appl. No.: 3,676

[52] U.S. Cl. ..................................192/2, 188/68, 188/71.5
[51] Int. Cl. ................................................F16d 67/00
[58] Field of Search..................188/68, 69, 71.2, 71.5, 171;
192/2, 52, 53 D, 53 F

[56] References Cited

UNITED STATES PATENTS

| | | | |
|---|---|---|---|
| 1,162,370 | 11/1915 | Keefer | 188/171 |
| 2,351,997 | 6/1944 | Morill | 192/2 |
| 2,949,989 | 8/1960 | Lindstrom et al. | 188/171 X |
| 3,169,607 | 2/1965 | Romney | 188/171 X |

*Primary Examiner*—Duane A. Reger
*Attorney*—Melville, Strasser, Foster & Hoffman

[57] ABSTRACT

A brake means for electric motors to stop rotation of the drive shaft immediately when the motor is de-energized. The motor shaft frictionally carries a brake plate and the brake plate bears frictionally against a surface of the rotor. The brake plate carries a stop-lug which is engageable by means of a solenoid operated plunger to stop the brake plate abruptly whereupon the rotor assembly is stopped frictionally. The plunger is actuated when the motor is de-energized and is retracted when the motor is energized.

3 Claims, 3 Drawing Figures

PATENTED MAY 2 1972 3,659,686
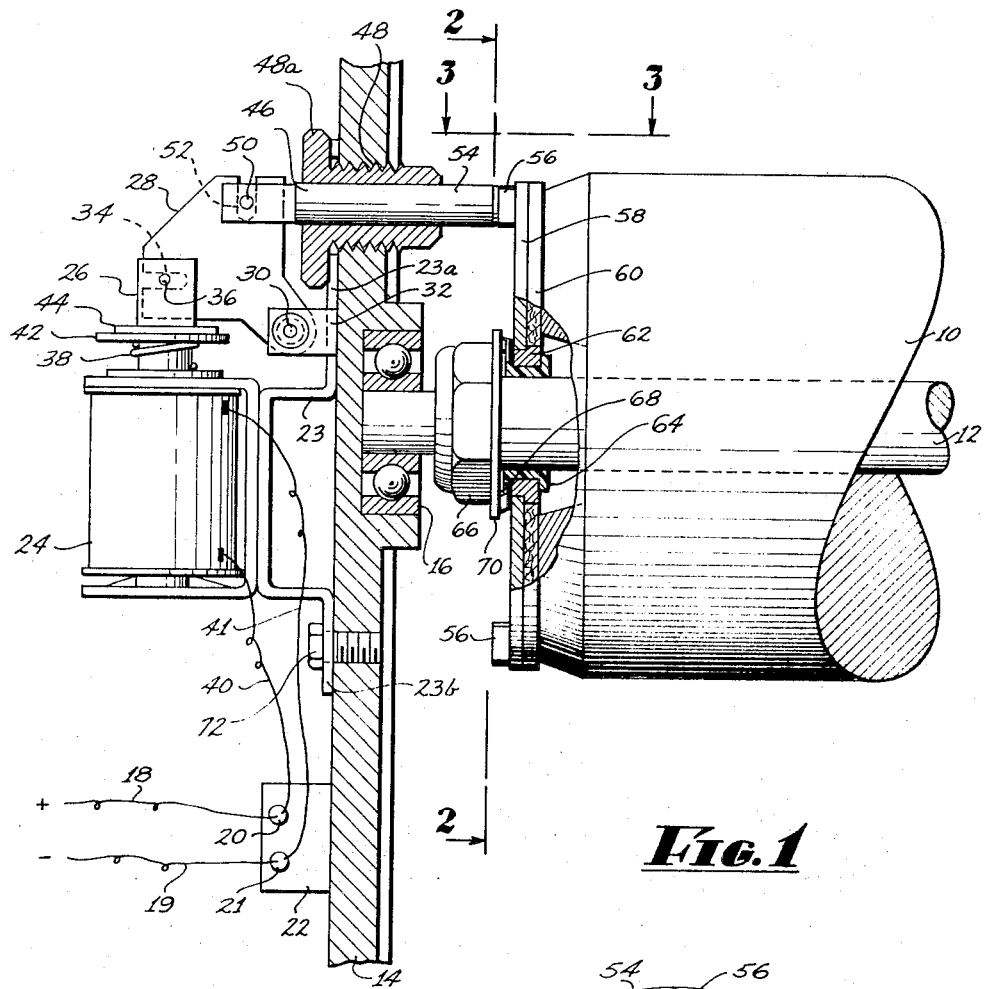
Fig.1
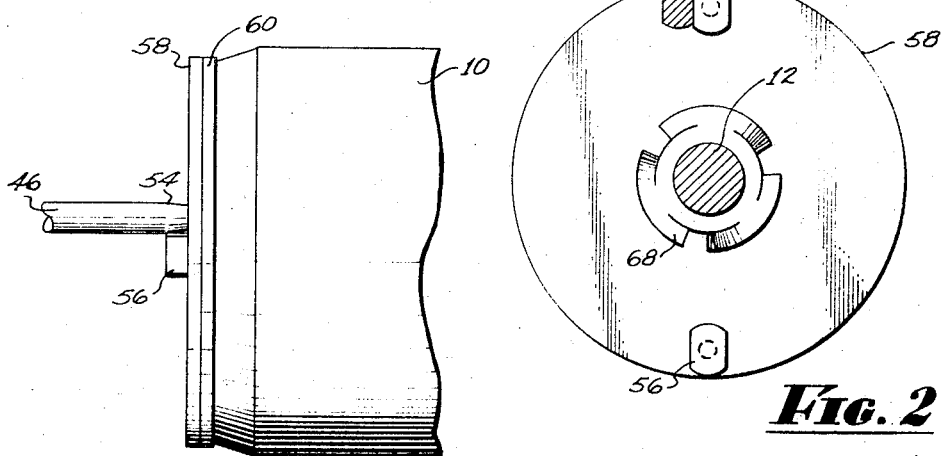
Fig.3
Fig.2
INVENTOR/S
JOSEPH M. MARKLEY,
BY *Melville, Strasser, Foster and Hoffman*
ATTORNEYS

BRAKE MEANS FOR ELECTRIC MOTORS

BRIEF SUMMARY OF THE INVENTION

The invention relates to a device for stopping an electric motor when its power is turned off, and more particularly to electro-mechanical brake means capable of almost instantly stopping rotation of the rotor under such conditions.

There are many types of equipment in which electric motors are used and which motors run intermittently and must be stopped within about one revolution of the rotor. An example of such devices is a vending machine wherein the motor must accurately position an element and must therefore be brought to a substantially immediate stop.

Because of the high speeds at which such motors run and the vast number of stops and starts which they make under normal operating conditions, such brake means in use up to the present time have been a constant source of trouble and have required frequent service or replacement.

According to the present invention, a brake means is provided which operates concurrently with de-energization of the motor and which is of extremely simple construction so that it can operate indefinitely with little or no maintenance or repair.

Basically, the invention comprises a rugged stop member which is moved into engagement with a stop on a brake plate frictionally mounted on the motor shaft such that the brake plate is abruptly and immediately stopped. The brake plate is in frictional engagement with a surface of equal area such as the end of the rotor which is rigidly mounted on the motor shaft. A friction disc may be interposed between the brake plate and the surface of the rotor. In this way the impact of the brake plate against the fixed stop member is rapidly dissipated by slippage between the brake plate and the parts with which it is in frictional engagement.

The arrangement to be described hereinafter presents a number of advantages over prior motor braking systems. For one thing, a considerably larger area of frictional engagement between the braking member and the rotating member is provided. Additionally, the friction surfaces are not moved into and out of engagement with each other upon application or release of the brake but, on the contrary, they are in engagement with each other at all times and rotate together as a unit except during the very brief period of slippage when the motor is stopped. Means are provided for adjusting the braking surfaces so as to permit control of the amount of rotation of the shaft after the motor is de-energized.

The construction shown is of such nature that it can be mounted as a unit on standard motors with little or no modification of the motor. It requires a minimum of space so that the motor is not made excessively bulky because of the braking device.

BRIEF DESCRIPTION OF THE DRAWINGS

FIG. 1 is a fragmentary vertical longitudinal section through one end of an electric motor with the braking device of the present invention attached thereto and with the rotor of the motor shown somewhat diagrammatically and broken away;

FIG. 2 is a fragmentary vertical section taken on the line 2—2 of FIG. 1 and showing the brake plate of the braking device; and FIG. 3 is a fragmentary horizontal section taken on the line 3—3 of FIG. 1 showing the brake plate and the stop member engaging a stop-lug on the brake plate.

DETAILED DESCRIPTION

With reference to FIG. 1, only the rotor 10, drive shaft 12 and end-plate 14 of a conventional electric motor are shown. Other parts of the motor including the housing and windings which surround the rotor, as well as the front or driving end of the motor, have been omitted for purposes of clarity. The rotor assembly including the drive shaft 12, to which the rotor 10 is rigidly fixed, is mounted in suitable bearings at both ends of the motor for substantially frictionless rotation. One of the ball bearings 16 for shaft 12 is shown in FIG. 1 in the rear end-plate 14 of the motor. Power is supplied for driving the motor by a pair of leads 18, 19, connected at terminals 20 and 21, respectively, of a terminal block 22, from which suitable connections (not shown) are made to the motor coil.

Mounted on a bracket 23 on the outside of the end-plate 14 is an actuating solenoid 24, which has its core 26 extending upwardly and parallel to the plane of the end-plate 14. The upper end of core 26 is slotted lengthwise for connection with a bell-crank 28 which is pivoted to the end-plate 14 on a rocker pin 30. The rocker pin 30 is supported on ears 32 which are bent outwardly from the upper mounting leg 23a of the bracket 23.

A bell-crank 28 which may be of sheet metal, fits within the slotted end of the core 26. A horizontal slot 34 is provided in the edge of the portion of the bell-crank 28 which fits within the slotted end of solenoid core 26, and a pin 36 through the end of the core 26 rides in the slot 34. In this manner the bell-crank 28 is pivoted back and forth upon vertical movement of the core 26.

In the embodiment here shown, the core 26 is constantly urged upward by a coil spring 38 in order to pivot the bell-crank 28 in a clockwise direction. When power to the motor is supplied through the leads 18, 19, the solenoid 24 is energized through the leads 40, 41 connected to the solenoid coil and to the main terminals 20, 21 on the terminal block 22. Energization of the solenoid 24 draws the core 26 downward against the effort of the coil spring 38, thereby pivoting the bell-crank 28 in a counterclockwise direction. The coil spring 38 is held in compression between the upper end of the coil of the solenoid 24 and a washer 42, which is retained by a split ring 44 in a peripheral slot in the core 26.

A stop-plunger 46 is supported for longitudinal movement in a bushing 48, extending through the end-plate 14 of the motor, and the outer end of the plunger 46 is connected to the bell-crank 28 by a pin 50. The end of the stop-plunger 46, through which the pin 50 passes, is slotted to receive the bell-crank 28, and the pin 50 rides in a vertical slot 52 in the bell-crank in the same manner that the solenoid core 26 is connected thereto. Thus, as the solenoid 24 is energized and de-energized, driving its core 26 up and down, the movement of the core 26 is transferred to the stop-plunger 46 to move its inner end 54 into and out of the path of a rearwardly projecting stop-lug 56 which is rigidly mounted adjacent the periphery of a brake plate 58 at the rear end of the rotor 10 of the motor. The brake plate 58 is mounted frictionally on the shaft 12 so that it normally rotates with the rotor 10.

As may be seen in FIG. 2, brake plate 58 is provided in this instance with two stop-lugs 56, which are diametrically opposed to each other on the brake plate and project rearwardly therefrom. The brake plate 58 is mounted on the motor shaft 12 for frictional engagement along its entire front face with a fiber disc 60, the opposite side of which abuts the circular rear end surface of the rotor 10. Both brake plate 58 and disc 60 are circular and supported at their centers on an outer, flanged bushing 62 and an inner liner 64 having a slip fit on the motor shaft 12. The liner 64 may be made of nylon or some other tough bearing material and desirably is provided with inner and outer flanges between which the bushing 62 is held. A lock-nut 66 is threaded onto the shaft 12 outward of the brake plate 58, and a spring washer 68 and a flat metal washer 70 are placed in that order on the shaft 12 between brake plate 58 and the lock-nut 66. As the lock-nut 66 is tightened down on the shaft 12, the spring washer 68 is compressed, thereby exerting the desired pressure between the faces of brake plate 58 and fiber disc 60.

It will be apparent from the foregoing description that when the motor is energized, the solenoid 24 is also energized, so that the stop-plunger 46 is withdrawn from the path of the stop-lugs 56 on the brake plate 58. When the power to the motor is disconnected by control means (not shown), the solenoid 24 is de-energized, permitting its core 26 to be moved upward by the coil spring 38 in order to pivot the bell-crank 28 clockwise. This in turn drives the stop-plunger 46 inward, so that its inner end 54 moves into the path of the revolving stop-lugs 56 on the brake plate 58. One of the lugs 56 therefore immediately strikes the end 54 of the stop-plunger 46 causing the brake plate 58 to come to a sudden stop. Rotation of the rotor 10 and shaft 12 are then likewise brought to a rapid stop because of the frictional engagement between the brake plate 58, fiber disc 60 and rotor 10. The amount of rotation which the rotor 10 will make after the brake plate 58 is stopped will depend in part on the amount of pressure exerted by the brake plate 58 against the fiber disc 60 and the end-surface of the rotor 10.

In order to ensure that the stop-plunger 46 can not become jammed in engagement with the stop-lug 56 when the motor is restarted, so that the solenoid 24 would be unable to retract the plunger 46, the end 54 of the plunger 46 is cut at an angle on both sides, as shown in FIG. 3. In practice, it has been found that flats cut at 5° to the longitudinal axis of the plunger 46 will prevent the plunger from becoming hung up on the stop-lug 56 as the motor starts. If desired a single stop-lug 56 may suit the purpose in place of the two shown, or for that matter, any number of such stop-lugs may be provided on the brake plate 58. Furthermore, notches or other suitable stop surfaces may be provided on the brake plate in place of the stop-lugs 56.

Referring to the manner in which the solenoid 24 is mounted on the motor, it will be apparent that in situations where space permits, the solenoid may be mounted perpendicular to the end-plate 14 of the motor, in which case the core of the solenoid would be extended so that it could move directly into engagement with the brake plate 58; and in such case the bell-crank 28 and stop-plunger 46 could be eliminated. In most cases, however, this would make the solenoid project too far to the rear of the motor and would be objectionable for that reason.

The mounting bracket 23 for the solenoid 24 is desirably fastened to the end-plate 14 of the motor at its upper end by the head 48a of a guide bushing 48, which fits within an open-ended slot in the upper leg 23a of the bracket 23 and is threaded into the end-plate 14 of the motor as shown. The lower leg 23b of the bracket 23 is secured to the end-plate 14 by a screw 72. The entire assembly can therefore be readily installed or removed as a unit, by simply loosening the bushing 48 and removing the mounting screw 72.

It will be understood by those skilled in the art that various changes and modifications can be made in the specific device herein described and shown in the drawings without departing from the scope of the invention as defined in the following claims.

The embodiments of the invention in which an exclusive property or privilege is claimed are defined as follows:

1. In an electric motor having a frame and a rotor assembly including a drive shaft rotatingly mounted on said frame, a braking device for positively and rapidly stopping rotation of the drive shaft when said motor is de-energized, comprising in combination:
   a. a brake plate comprising a circular disc frictionally mounted at its center on said rotor assembly for rotation with said drive shaft,
   b. a stop-lug fixed on said brake plate adjacent the periphery thereof, said stop-lug moving in a rotary path when said brake plate rotates,
   c. a stop member comprising a plunger slidably mounted on said motor frame for longitudinal movement axially of said motor drive shaft into the path of said lug, for positively arresting rotation of said brake plate,
   d. said plunger being mounted the same distance radially of said drive shaft as said stop-lug, and
   e. actuating means for moving said stop member into engagement with said face of the circular disc for engagement by said stop-lug upon de-energization of said motor in order to stop said brake plate and rotor assembly, and for moving it out of the path of said stop-lug upon energization of said motor to permit rotation of said brake plate and rotor assembly, said frictional mounting serving to dissipate the impact of said stop-lug on said brake plate to said rotor assembly.

2. A braking device as set forth in claim 1, which includes a second stop-lug fixed on said face of said circular disc diametrically opposite said first stop-lug and equidistant from the axis of rotation thereof.

3. A braking device as set forth in claim 1, wherein said rotor assembly is provided with a circular end surface, and a fiber disc is mounted coaxially with said brake plate on said motor drive shaft in surface-to-surface engagement with said brake plate, and between said brake plate and circular end surface, and a lock-nut threaded onto said drive shaft adjacent said brake plate on the opposite side thereof from said fiber disc, and a spring washer disposed between said lock-nut and brake plate to urge said brake plate axially into engagement with said fiber disc, and for increasing the pressure between said brake plate and fiber disc as said lock-nut is tightened against said spring washer.

* * * * *